(12) United States Patent
Davidson et al.

(10) Patent No.: US 11,288,862 B2
(45) Date of Patent: Mar. 29, 2022

(54) SYSTEM AND METHOD FOR TRANSFORMING GRAPHICAL IMAGES

(71) Applicants: John Davidson, Etobicoke (CA); Neil Compson, Kingston (CA)

(72) Inventors: John Davidson, Etobicoke (CA); Neil Compson, Kingston (CA)

(*) Notice: Subject to any disclaimer, the term of this patent is extended or adjusted under 35 U.S.C. 154(b) by 0 days.

(21) Appl. No.: 16/945,346

(22) Filed: Jul. 31, 2020

(65) Prior Publication Data

US 2022/0036651 A1 Feb. 3, 2022

(51) Int. Cl.
*G06T 17/10* (2006.01)
*G06T 7/60* (2017.01)
*G06T 17/20* (2006.01)

(52) U.S. Cl.
CPC .......... *G06T 17/10* (2013.01); *G06T 7/60* (2013.01); *G06T 17/20* (2013.01); *G06T 2207/20182* (2013.01)

(58) Field of Classification Search
None
See application file for complete search history.

(56) References Cited

U.S. PATENT DOCUMENTS

| 7,555,157 B2 | 6/2009 | Davidson | |
|---|---|---|---|
| 2003/0086603 A1* | 5/2003 | Davidson | G06K 9/00 382/154 |
| 2009/0180712 A1* | 7/2009 | Pollack | B29C 51/00 382/285 |
| 2011/0308119 A1* | 12/2011 | Ecker | G06Q 30/02 40/427 |
| 2014/0300676 A1* | 10/2014 | Miller | B41J 3/4073 347/110 |
| 2015/0375445 A1* | 12/2015 | Grundhofer | B29C 51/264 700/98 |
| 2019/0048531 A1* | 2/2019 | Gordon | D21J 3/00 |

* cited by examiner

*Primary Examiner* — Edward Martello
(74) *Attorney, Agent, or Firm* — Elias Borges

(57) ABSTRACT

A method for transforming a two-dimensional graphic image into a two-dimensional distorted image which can then be used to recreate an accurate representation of the two-dimensional graphic image when applied onto a 3D surface. The method includes the steps of producing and identifying a target 3D grid from a plurality of flat polymer webs each having a grid pattern printed thereon, the target 3D grid bearing an accurate representation of the 3D surface. The three-dimensional shape of the target grid is then digitized to form a geometric model of the target grid as a series of data points. Creating a uniform smooth 3D model from the series of data points and then texture mapping the two-dimensional graphic image onto the uniform smooth 3D model to create a texture map. The two-dimensional distorted image is then created from the texture map and the two-dimensional graphic image.

11 Claims, 5 Drawing Sheets

SYSTEM AND METHOD FOR TRANSFORMING GRAPHICAL IMAGES

CROSS-REFERENCE TO RELATED APPLICATION

This application claims priority from U.S. provisional application No. 62/882,000 filed Aug. 2, 2019, the entirety of which is incorporated herein by reference.

FIELD OF THE INVENTION

The invention relates generally to methods and systems for producing a distorted image to be applied to a two-dimensional web which when said web is formed into a three-dimensional part, the part shall display a substantially non-distorted image.

BACKGROUND OF THE INVENTION

Many production processes involve forming or molding a three-dimensional part from a two-dimensional web or sheet. For example, plastic thermoforming, metal stamping, and metal cold forming involve forming a three-dimensional part from a sheet of a substrate material through the use of vacuum and/or pressure that conforms the web to a mold or die. Blow molding involves the use of air pressure to shape a parison comprising a substrate material inside a mold. Other production processes in which a three-dimensional part is formed from a two-dimensional web include pressing, stretch forming, shrink forming, and shrink wrapping. In addition, in-mold decoration and insert-mold decoration are processes related to the molding of a three-dimensional part wherein the part is molded and decorated simultaneously.

Those of skill in the art will appreciate that the two-dimensional web used in these processes may undergo complex changes during production. For example, consider a thermoforming process using a thermoplastic web. Prior to thermoforming, the plastic web is flat and has a substantially uniform thickness. During thermoforming, the heated plastic web stretches as it is formed. In most cases, the topographic die used in thermoforming is colder than the heated plastic sheet substrate (web). As a result, when the plastic substrate makes contact with the mold, it "freezes off" at that point and ceases stretching. Other areas of the plastic substrate not yet in contact with the mold continue to stretch. The effect is a potentially large variation in thickness and relative stretch of the substrate as it comes into contact with the mold.

The initial steps in pre-decorating a substrate in web form often are easy and inexpensive. In the case of a thermoplastic web, prior to thermoforming the plastic webs are in the form of flat sheets or rolls and can easily be fed through a printer to apply the decoration. A web made of metal usually takes the form of sheets and can also be easily and inexpensively decorated. However, during the production process, a flat substrate deforms and stretches to conform to the mold or die. This stretching and deformation of the substrate misaligns and deforms the decoration depending on the relief of the mold. The greater the relief of the mold, the greater the stretching and deformation. If the relief is significant, then the misalignment and deformation in the decoration may be intolerable.

One approach to solving the problem of misaligned and deformed images is to first transform the original image before applying it to the web. The distortion applied to transform the image is intended to correct for the stretching and deformation of the web as it is processed. If the transformation is done correctly, the final part will display a non-distorted image closely resembling the original image. Creating the correct transformed image from the original image is not a trivial matter. Prior art methods for performing the correct distortion to the original image have met with some success but are often difficult and time consuming to use. U.S. Pat. No. 7,555,157 to Davidson et al., the entirety of which is incorporated herein by reference, discloses a system and method for transforming an image into a pre-distorted image which can then be applied to webs such as thermoplastic sheets. The method disclosed in U.S. Pat. No. 7,555,157 includes the steps of optically scanning the molded part to create a digital model of the 3D part and then applying the 3D digital model to the original image to create the transformed image. A key step in the method disclosed by the '157 patent is the formation of a 3D substrate upon which the image is to be applied and then carefully measuring the topography of the SD substrate to create the digital 3D model. The resulting 3D model created by the method disclosed in the '157 method was often inaccurate resulting in a transformed image which was also inaccurate. Furthermore, so much time and effort was required to create an accurate 3D model using the method of '157 that the method was impractical to use. Therefore, while the method disclosed in the '157 patent can theoretically produce useful transformed images, more practical approaches were desired.

SUMMARY OF THE INVENTION

In accordance with one aspect of the present invention, there is provided a method for transforming a two-dimensional graphic image into a two-dimensional distorted graphical image which is to be pre-applied onto a three-dimensional surface of a formed part. The first step in the method includes providing a plurality of flat webs each having a grid pattern printed thereon, the grid pattern consisting of a uniform array of grid markers (grid dots) separated from each other by a space. A representative sample of the grid markers common to each web is selected and each of the webs is transformed into the part having the three-dimensional surface. The position of each grid marker in the representative sample of grid markers for each transformed web is then recorded. A target grid is then identified by selecting the transformed web whose grid markers in the representative sample reside closest to a center of variance of the positions of the grid markers in the representative sample of all of the transformed webs. The three-dimension shape of the target web is then digitized to form a digital representation of the target grid as a series of data points. A distinct 3D model is then created from the digitized three-dimensional representation of the target grid, the distinct 3D model containing a precise delineation of the series of data points. The distinct 3D model configured to have texture data attached to it, and able to manipulate its data to output new texture graphics and data. Texture mapping the two-dimensional graphic image onto the distinct 3D model to create a texture map. Finally, creating a two-dimensional distorted image by rendering the processed (distorted) texture map.

In accordance with another aspect of the present invention, there is provided a method of creating a 3D target grid to be used as a physical 3D model for transforming a two-dimensional graphic image into a two-dimensional distorted graphical image which is to be pre-applied onto a three-dimensional surface of a formed part. The method includes the steps of providing a plurality of flat webs each having a grid pattern printed thereon, the grid pattern consisting of a uniform array of grid markers (grid dots) separated from each other by a space, the webs each being formed of a thermally transformable material. The next step consists of selecting a representative sample of the grid markers common to each flat web and then forming each of the webs into the three-dimension surface. The next step involves measuring and recording positions for each grid marker in the representative sample of grid markers for each formed web. Finally, the target grid is identified by selecting the formed web whose grid markers in the representative sample reside closest to a center of variance of the positions of the grid markers in the representative sample of all of the formed webs.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention.

DESCRIPTION OF THE DRAWINGS

In the drawings like characters of reference indicate corresponding parts in the different figures.

DETAILED DESCRIPTION OF THE INVENTION

In order to facilitate the formation of an image on a 3D part from a pre-decorated 2D substrate sheet (web), the present invention provides a method of producing a transformed image from an original image. The transformed image is applied to the 2D substrate by means of printing or the like, and upon processing the 2D substrate into the 3D part, the transformed image will be stretched and deformed into a final image which closely resembles the original image. The method of forming a 2D sheet with the transformed image consists of six principle steps:

1. Printing, forming and selecting a target grid;
2. Digitizing the target grid to collect point data from the target grid.
3. Formatting the point data into a digital 3D model of the target grid.
4. Applying an original image file to the 3D model.
5. Distorting the image file using the 3D model to create the transformed image.
6. Applying the transformed image onto the web (substrate sheet).

Applying the Grid Pattern

Figure 1:
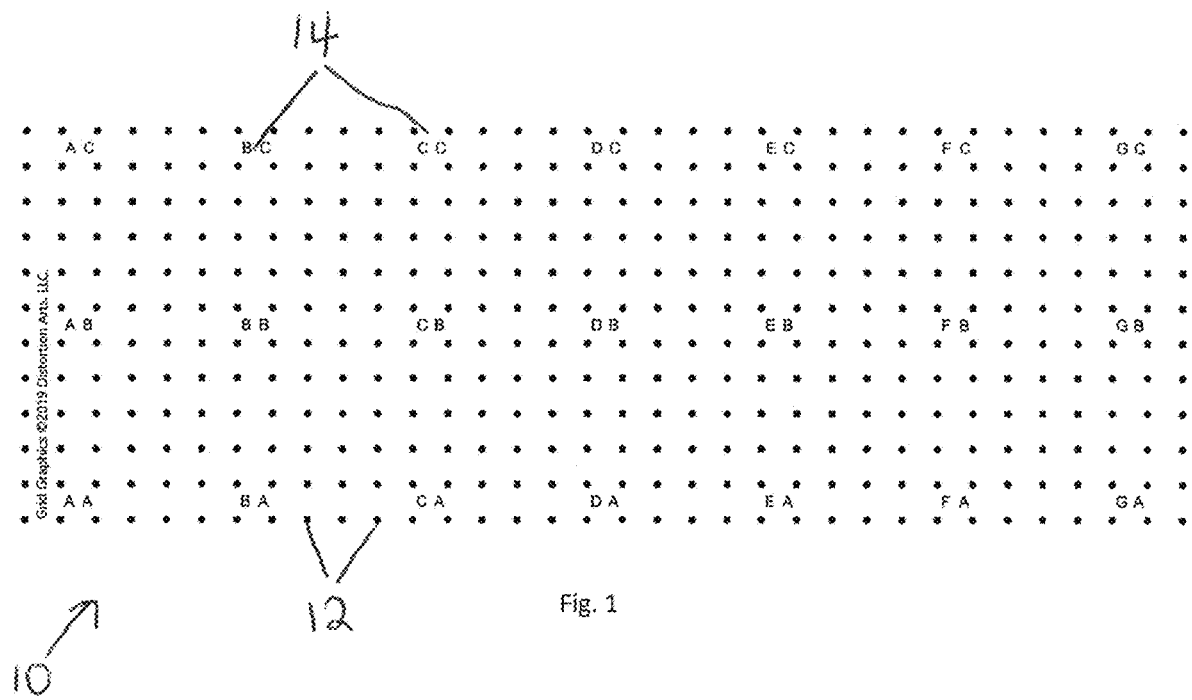
FIG. 1 is a top view of the grid pattern portion of the present invention.

The critical first step in the method begins by selecting a plurality of two-dimensional substrate sheets each of which will be transformed into the finished three-dimension part by molding, blow molding, heat shrinking or whatever method is to be applied to manufacture the finished part. Preferably, at least ten substrate sheets are used, but often 20 substrate sheets or more are used depending on the part being formed and the nature of the image being applied. On a surface of each substrate sheet there is printed a grid. The grid consists of a uniform pattern of small circular marks (grid dots) and unique identifiers which are arranged as a two-dimensional grid. This unique grid pattern is important as it makes the creation of the three-dimensional model, the distortion data and the resulting distorted artwork possible. Referring to FIG. 1, a preferred embodiment of the grid pattern is shown generally as item 10 and consists of a plurality of regularly spaced circulars marks 12 (grid dots) which are preferably between 1.25 mm to 5.08 mm in diameter. The physical size of the final product determines the size of the grid dots used. The spacing of the grid dots preferably vary between 5 mm to 25.4 mm depending on the physical size of the final product, although the size of the grid and the spacing are not restricted to these preferred values.

The grid also includes a uniform matrix of spaced apart unique identifiers which are interposed between every fourth or fifth grid dot depending on the dimensions of the grid file. Preferably, the unique identifiers (items 14 in FIG. 1) consist of an arrangement of letters (grid letters) which are arranged in a repeating pattern such as AA, AB, AC . . . BA, BB, BC . . . CA, CB, CC . . . and so forth as shown in FIG. 1. The grid letters (unique identifiers) serve as a visual cue which allows for the identification of a regional location across the product. Preferably the grid letters are placed as a pair, where the first letter represents a count of columns across the grid while the second letter represents the count of rows across the grid print. For example, the first letter in the pair representing the column and the second letter in the pair representing the row, hence AA, AB, AC, AD, AE (and so on) would be formed down the first column, while BA, BB, BC (and so on) would be formed down the second column. This grid is displayed across the surface of the substrate sheet by means known generally in the art. For example, if the substrate sheet is to take the form of a thermoformable plastic sheet (say for use in rigid applications), then the grid can simply be printed across one surface of the plastic sheet. Alternatively, the grid could also be printed onto a shrink film if the desired end product is a shrink sleeve and wrapping application.

Forming the Transformed Grids

Figure 2:
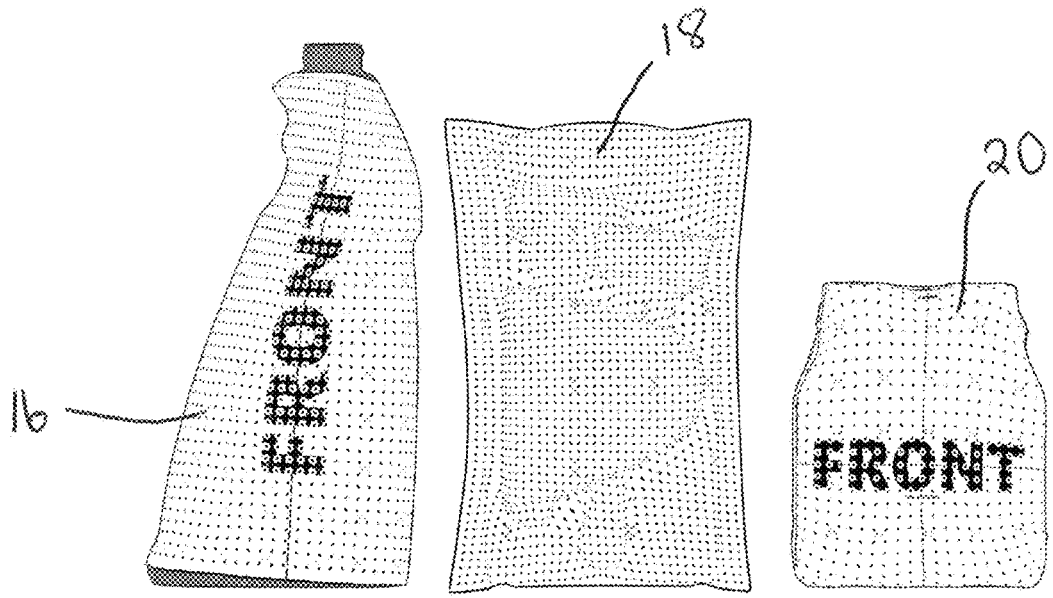
FIG. 2 is a photographic top view of the grid pattern shown in FIG. 1 applied to different formed sheet substrates.

Each of the substrate sheets that have been marked with the grid pattern is provided with strategically positioned indexing points which are configured to mate with corresponding index features in the forming machine the substrate sheet is destined to be formed on. This ensures that each marked substrate sheet can be placed in the forming apparatus (vacuum molding machine, shrink wrapping device, etc.) in exactly the same position. The indexing points preferably form register holes. Positioning each of the marked substrate sheets in identically the same way is necessary to ensure that the pattern of physical deformation of the plurality of sheets is as consistent as possible. The marked grids can then be correctly positioned in the forming machine and formed into the desired three-dimensional shape as shown in FIG. 2. FIG. 2 illustrates three different sheets formed into three different shapes by three different methods. Item 16 being formed by shrink sleeve technology, item 18 being formed by thermoforming and item 20 being formed by shrink wrap. Each of the marked sheets are then transformed into the same desired three-dimensional shape (grid) in the same forming machine. The end result is a plurality of 3D parts (grids) each of which displays the grid pattern thereon. The step of forming the grids is preferably performed on the machinery which is intended to create the finished three-dimensional parts. This may necessitate sending the marked substrate sheet to a client location to have the client perform the forming step on their transforming machines.

Variance Analysis

Figure 3:
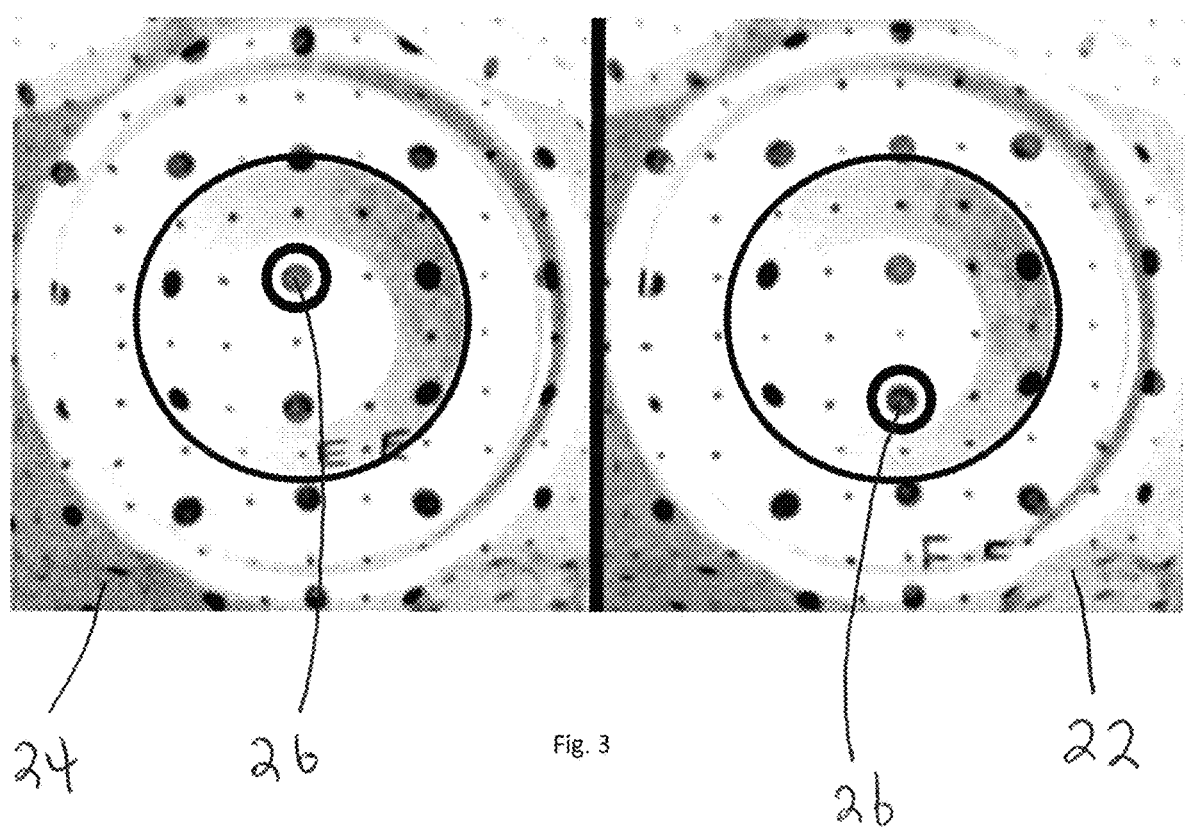
FIG. 3 is a photographic top view of an example production variance.

Due to a variety of factors, each substrate is formed slightly differently even if formed in the same machine. As a result, two different sheets can be stretched and shrunk and deformed in slightly different ways depending on the forming conditions. Therefore, the sheets will vary from one sheet to the next and this variance can have a significant impact on the accuracy of any image deformation which may occur. FIG. 3 illustrates how the same forming operation can form parts which vary slightly. Parts 22 and 24 were formed from the same type of substrate sheet molded on the same molding machine, yet the same grid dot 26 is in a slightly different position in part 22 than it is in part 24. To minimize the part to part variance, a variance analysis is performed to evaluate the performance of the grid forming operations. Repeatability is key to success in distortion production and is of the utmost importance. Failure in achieving a low level of variance can compromise the success of a project when precise registration of graphics and tight tolerances are required. To perform the variance analysis, each of the grids are photographed. The series of photographs allows for the part to part variance to be observed and measured between the grids. Variance measurement data is accumulated by recording the two-dimensional (x,y) location of a representative sample (number) of grid dots. Preferably at least eight representative grid dots per region of the grid sample is used; however, depending on the nature of the 3D part and the image being applied, a greater number may be required. This measurement data is preferably based on the pixel dimensions of the grid sample photographs, although actual physical measurements can be taken of the grid dots. The array of unique identifiers makes it possible to ensure that the same representative sample of grid dots is being measured for each, which in turn makes it possible to compare how each grid varies when compared to the other grids. The variance measurements are input into a software calculator which converts the pixel based measurement data into the respective real world size in millimeters. The calculator is a spreadsheet which matches pixel based measurements to millimeters from a variety of different parameters and performs calculations to determine the level of variance of the representative grid dots (left to right and top to bottom) of the grid. The results of the analysis produced by the calculator include:

The bidirectional level of variance (left to right, top to bottom).
The levels of variance per side of a shrink package.
The number of grid samples that are within 1 standard deviation.
Identification of the most outlying samples in the grid series.
Identification of the target grid to be used for digitizing and distortion.

Figure 4:
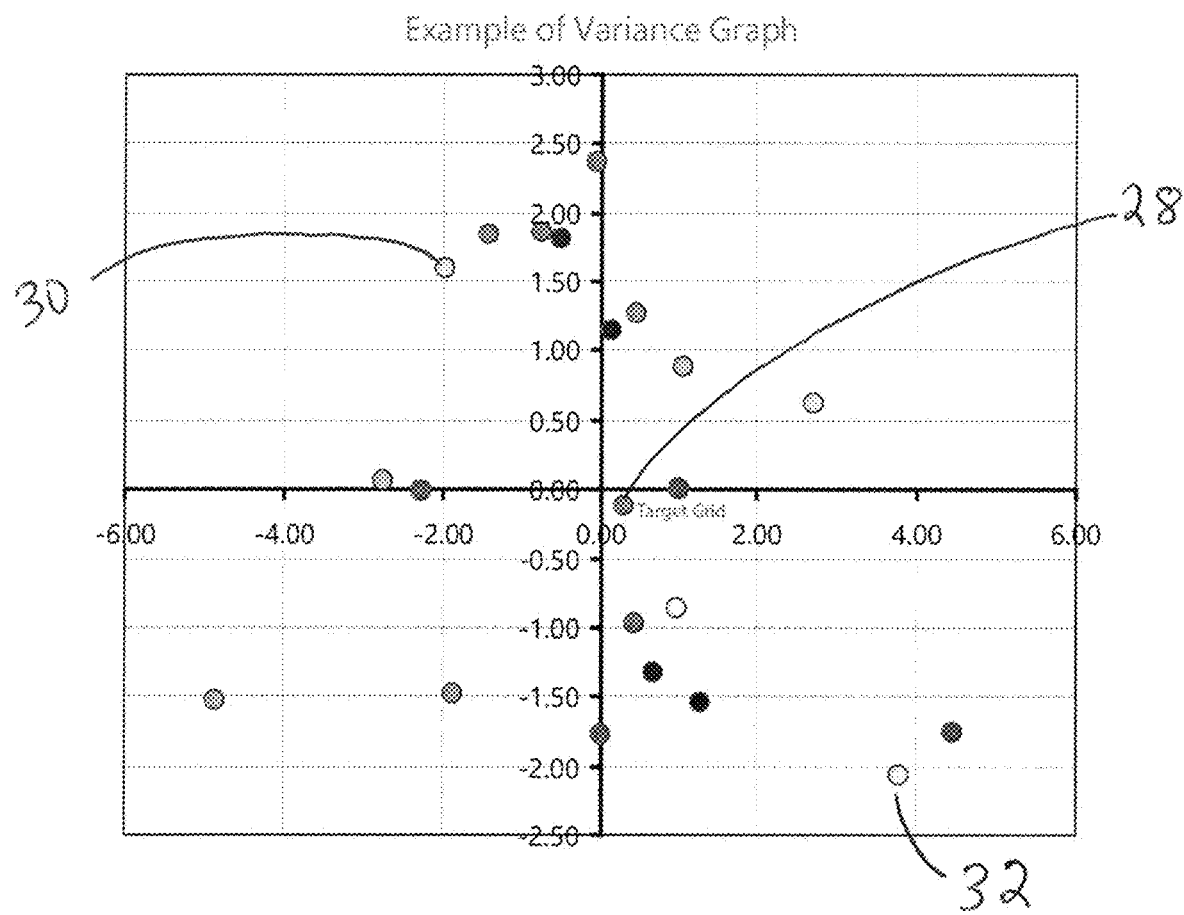
FIG. 4 is a graphic illustration of the variance of a plurality of formed sheet substrates.

The Target Grid is the grid sample that resides closest to the center of variance and is best representative of the average or typical grid sample from the series. Essentially, the relative position of the sample dots are compared between the grids to find the grid which is closest to the center of variance. FIG. 4 summarizes the variance measurement for 22 different grids with each data points representing an average variance of each grid. The data points in FIG. 4 represent the average distance from the center of variance for the combined representative data points. So if you have 8 data points (regions) per sheet, the data point represents all 8 points combined and shows their distance from the combined center of variance. We can zero in on 1 data point if we want but usually just need to find the target grid based on all of the averages. As can be seen, measurement 28 taken from one grid is closest to the center of variance while measurements 30 and 32 representing the variance measurement from two other grids are farther away from the center of variance. Since the grid represented by point 28 is the grid closest to the center of variance, that grid is selected as the target grid which will be used for further steps in the method.

At the conclusion of variance analysis, the method can also be used to provide a brief variance report to a customer that outlines any observational traits with the results of forming, and states the overall level of variance in both millimetres and inches. The method can also provide a variance movie (or movie per side of a shrink package) which visually demonstrates the sample-to-sample variance by presenting the sequential series of grid sample photographs.

The variance analysis is also useful in revealing which portions of the substrate sheet are most likely to vary significantly from part to part as the substrate sheets are formed. The variance analysis can be used to identify areas of higher and lower variance. Preferably, critical portions of the image requiring accurate positioning would be restricted to the areas of the substrate sheets which have been identified as likely to experience the lowest part to part variance.

For shrink packaging applications, the variance analysis can provide a more comprehensive analysis which includes:
1. Identification of constant state repeatability.
2. Variance in size and shape of the shrink-wrapped part.
3. Film placement variance.
4. The average percentage of shrinkage for a given side of a package, compared against its native preshrunk size.
5. Identification of high shrink and high variance regions across the package.
6. Development of an Art Template that identifies the optimal size of artwork per side of the package.
7. 'Variance Movies' which show photos of each side of the package in numbered succession to show the part-to-part variance that is being produced.

Figure 5:
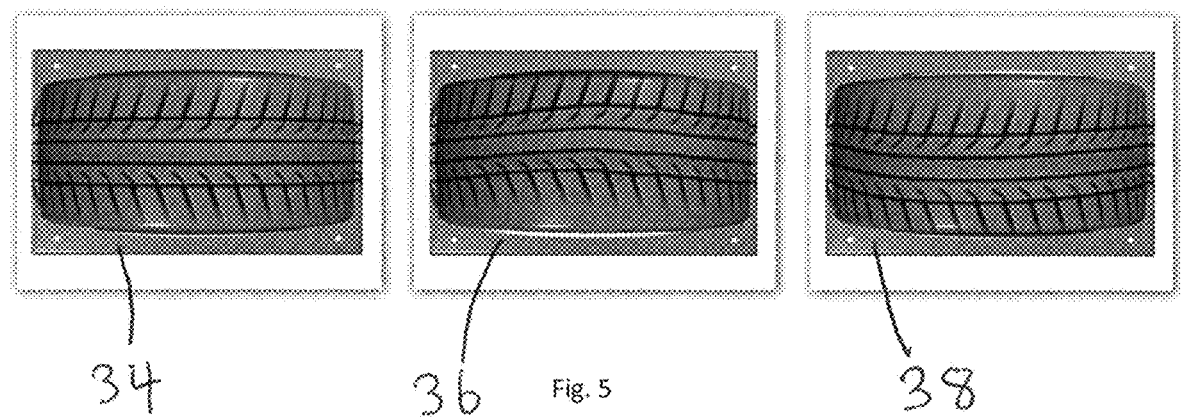
FIG. 5 is a photographic view of example VRsims produced by the method of the present invention.

The variance analysis also allows for the creation of virtual simulations (VRsim) illustrating how the part variances can affect image distortion. A variance VRsim is a simulation render which depicts the effect of the overall±level of variance on a simulated final production part (the target grid with distorted art). FIG. 5 illustrates how a VRsim render can depict image distortion depending on part variation, with render 34 representing the image applied to the target grid, render 36 the image applied to a grid with a positive variance and render 38 the image applied to a grid with a negative variance. The variance VRsim is an accurate simulation of how the distorted art would perform if used with a series of final parts which formed identically to the grid series used in variance analysis. The variance VRsim can be presented as either a series of multi-view still images, an animated video, interactive 3D PDF, or interactive WebGL object on a webpage. The use of a 3D PDF allows for interactive toggling between the target grid, variance (+), and variance (−) simulations.

Digitizing—Data Collection

Figure 6:
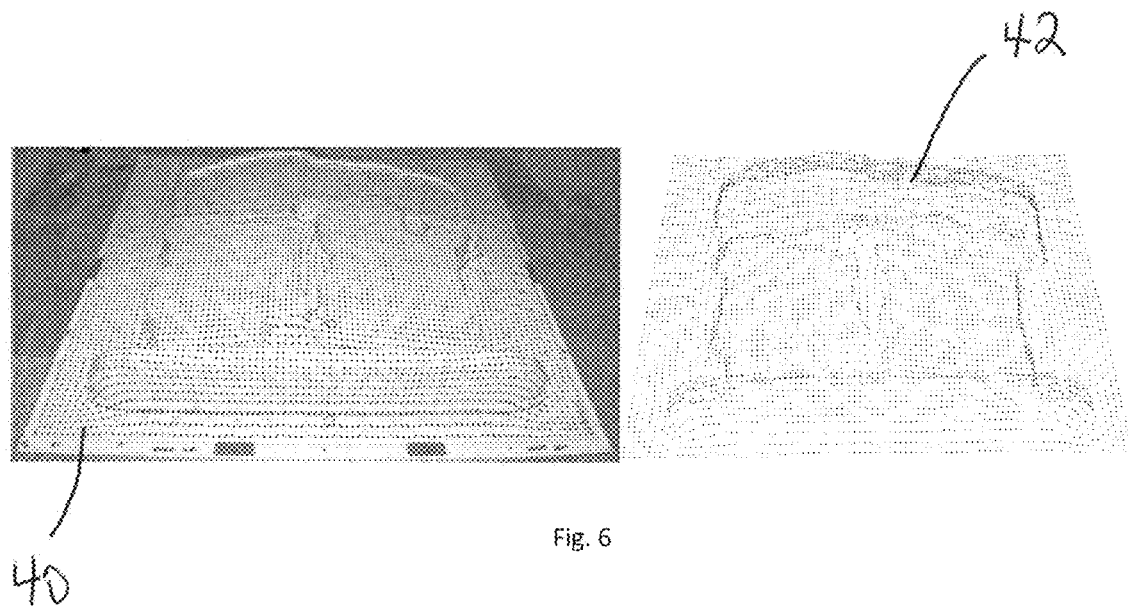
FIG. 6 is a photographic view of a target grid made in accordance with the present invention compared to the 3D data points generated by the photogrammetry of the target grid.

When the target grid is selected from the variance analysis, the next step in the process can commence, namely the digitizing of the three-dimensional shape of the target grid. Digitizing is the technical process by which the shape and size of the real world target grid will be digitally represented as a geometric model in three dimensional space by a series of data points. FIG. 6 illustrates how the three-dimensional shape of the target grid (item 40) is scanned into a 3D datapoint cloud (item 42) by means of photogrammetry. The series of digitized 3D data points are a virtual reality equivalent to the actual printed grid dots across the surface of the physical target grid. The preferred method of digitizing is photogrammetry. Photogrammetry involves measuring common points between multiple photographs taken from different angles around a real world object and calculating the location of the points in three-dimensional space through triangulation. The photogrammetry results in a collection of data points that have 3 dimensional coordinates. The resulting 3D data points from the photogrammetry digitizing process serves as the basis for the creation of a uniform quadrangulated 3D model (with corresponding UV texture mapping coordinates) to be used for the generation of a distortion.

A variety of photogrammetry hardware and software combinations are available on the market which are suitable for use in digitizing/data-collection step. These photogrammetry rigs and software are used to create 3D models of objects for a variety of purposes including 3D printing and the like. U.S. Pat. No. 7,555,157 describes one method of photogrammetry; however, the method of photogrammetry disclosed therein is outdated and cumbersome. In recent years reliable and relatively inexpensive photogrammetry rigs and software with improved performance have become commercially available. The photogrammetry application Photomodeler™ has been shown to be convenient for use with the present invention for collecting the digitized 3D data points, although other suitable applications are available such as Agisoft Metashape™, Autodesk ReCap™, AliceVision Meshroom™, Bently ContexCapture™, VisualSFM™ and various other applications. The photogrammetry step results in a data file containing the 3D data points extracted from the target grid. The 3D data points represent a sort of "low resolution 3D model" of the target grid and, in itself, is not sufficient to generate a finished transformed image which will yield a finished image of suitable quality. The 3D data points must be converted to a smooth high resolution model, preferably by transforming the 3D data points into a uniform quadrangulated 3D model ('Digitized Model'). The Digitized Model consists of a uniform quadrangulated model with corresponding UV texture mapping coordinates. Numerous tools and techniques are well known in the art for creating a smooth higher resolution 2D image from a lower resolution 2D model. It's been discovered that producing a smoother high resolution 3D model for use in the present method from a lower resolution 3D model can be achieved in much the same way using a 3D animation application like Autodesk Maya™, 3DS Max™, Rhinoceros 3D™, Cinema 4D™, Modo™, or Blender™. One such technique is discussed below.

Creation of Final Digitized Model

The triangulated point cloud object from the digitizing step contains all of the positional data points collected by digitizing the grid dots. The next step is to format the data points in to a 'Distortion Object' that will allow for graphic texture application and correct, precise distorted graphic image output. For example, using a 3D computer graphics application such as Blender™ (a free and open source 3D computer graphics software under the GNU™ general public license), the data points from the triangulated point cloud are re-organized in an order and format that resembles the order and format of the digitized grid, such that when the points are quadrangulated, the result is a grid object whose data points are ordered correctly and has each data point assigned a UV coordinate that is also ordered correctly, thus allowing distortion calculations and distortion image rendering to accurately take place.

To better simulate the physical shape of the digitized grid, and to more accurately apply and distort an image, smoothing is applied to the distortion object. Traditionally, smoothing a polygonal object (in Blender or other 3D programs) is achieved by subdividing the object so that the vertex positions are relaxed in relation to each other, and a number of intermediate vertexes are interpolated between the original vertexes to achieve a smooth surface. The invention's 'Distortion Object' achieves smoothing without relaxing the vertex positions while interpolating a number of intermediate vertexes. The result is an object that is smooth, represents the physical shape of the formed grid and keeps the coordinates of the grid data points unchanged from their original position when digitized.

To accomplish smoothing without changing the coordinates of the data points, a control object is utilized. A control object is an object (such as a bone system, skeleton, control null, lattice, constraint object, rig) that is connected to another object in order to manipulate it by adjusting the shape of the control object. An example of a control object in a 3D animation program would be rotating a 'bone' control object to manipulate a highly detailed polygonal model of an arm or hand. For the purposes of the distortion process, a control object is used to keep the data points in position while allowing for interpolated smoothed, intermediate points to be added in between the data points. To use a control object for these purposes, a custom build of Blender has been developed to allow for an increase in vertex density of control objects.

Transformation (Distortion) of Image

Figure 7:
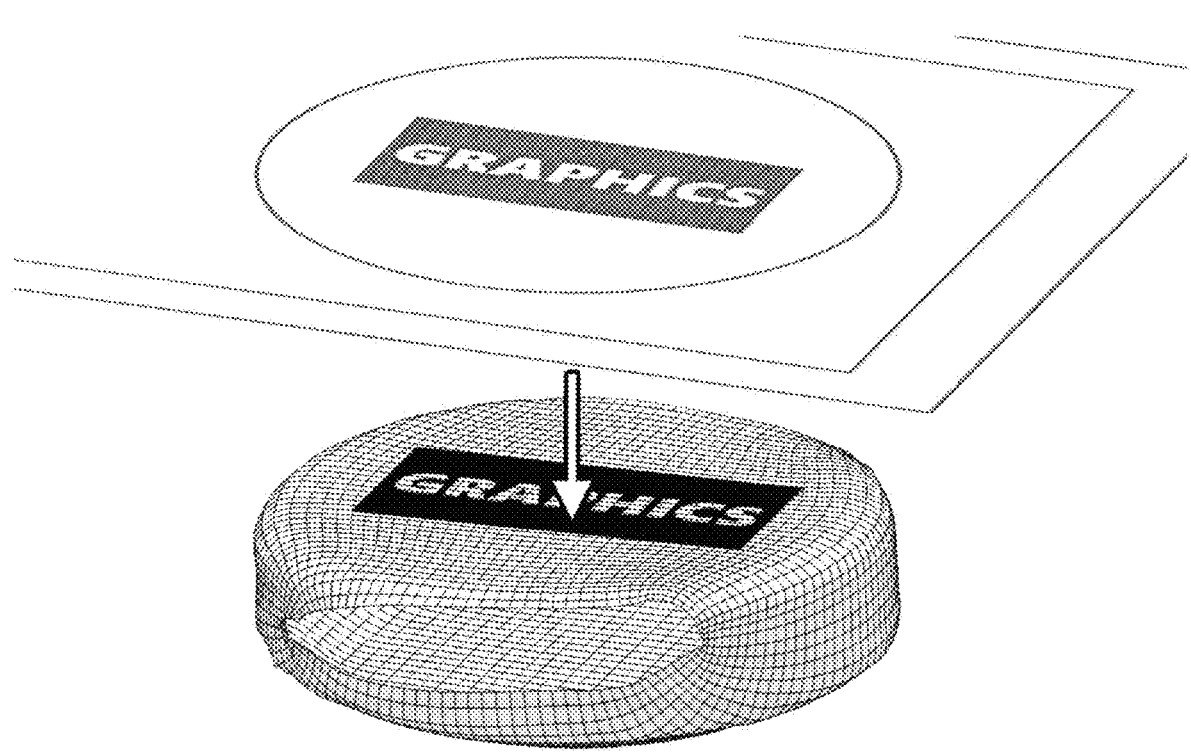
FIG. 7 is a photographic visualization of the 3D projection of a source image.

The distortion process involves producing distorted artwork from the combination of two-dimensional artwork (an original image) and the final digitized target grid as illustrated in FIG. 7. The artwork is designed according to a 2D CAD drawing of the final product so that it can be applied to the corresponding 3D model with a planar texture projection in the modified Blender 3D software. A texture projection applies a texture map (explained below) to a 3D model by projecting it like a film projector applies an image to a screen in the real world. The projection of artwork upon the 3D model creates a connection between the 2D art file being projected, and the 3D data that the artwork is being projected upon, whereby each pixel of the 2D artwork has a position in relation to the 3D data and UV texture mapping coordinates of the digitized 3D model, which in turn is representative of the formed/shrunk target grid and the printed grid pattern. The texture map is a bitmap image that is applied or displayed across the surface geometry of a 3D model. UV texture mapping coordinates serve as a set of instructions or locations to assign the 2D texture map to the surface geometry of the 3D model. Texture mapping is a common component of many 3D and CAD programs and is a built in feature in Blender.

Figure 8:
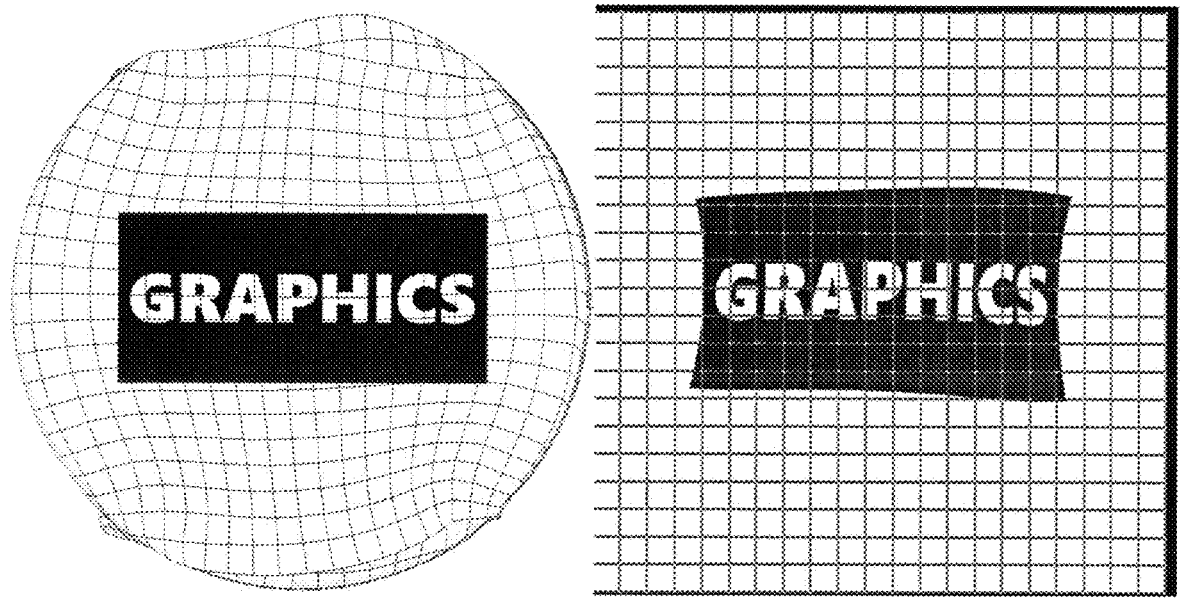
FIG. 8 is a photographic image illustrating art projection onto a 3D model and the resulting distortion image.

The transformed image (distorted art) is produced in a bitmap file format by calculating the position of each pixel of the projected art and converting the pixel positions to have 2D coordinates in relation to the order and dimensions of the original grid data. Render engines in 3D applications can utilize a process called render mapping (also known across various 3D software packages as render 'baking'). The render mapping tools are used to generate a UV texture map from the surface color of the digitized 3D model by using the model's corresponding set of UV texture mapping coordinates. The surface color of the 3D model consists of the colored pixels from the 2D artwork being projected upon the surface of the model. The UV texture mapping coordinates of the digitized 3D model are laid out in the same arrangement as the grid pattern that was printed, formed/shrink wrapped, and digitized. This produces a relationship between the projected artwork and the printed grid pattern. The creation of a render is a virtual equivalent to the real world target grid being unformed/unshrunk back into the flat print after having "painted" graphics onto the formed/shrunk product. The distortion render demonstrates how the artwork must look prior to being formed/shrunk in order to look correct when formed/shrunk. FIG. 8 illustrates a sample art projected onto a 3D model (left) and the resulting rendered distortion (right). The rendered distortion can then be used for printing and forming the final distorted part.

When the original image for a distortion project consists of vector graphics, or a combination of vector and bitmap graphics, the product of the distortion render is used as a guide for the manipulation of the shape of the vector graphics in order to match the distorted artwork presented in the distortion render.

Most art files are supplied in vector format, and vector art files cannot be used in the distortion render process without first converting the file to a bitmap format. Therefore, the distortion of the original vector art file must be performed with the use of the distortion render (created from a bitmap image) as a guide and quality control check and a "manual" distortion of the vector artwork must be performed using one of the warping tools provided by software applications like Adobe Illustrator™. Adobe Illustrator has warping tools (Warp Brush and Envelope Distort) which can be used to "manually" distort vector graphics and bitmap images. The method of the present invention preferably includes the use of an envelope mesh tool such as those included in Adobe Illustrator. The envelope mesh is used by Adobe Illustrator's Envelope Distort function in order to distort the vector artwork. The 2D envelope mesh functions as a simplified deformation or manipulation tool for graphics contained within the envelope. The envelope mesh distortion produces the same result as the distortion render, and the distorted vector artwork produced by the envelope mesh will match the distorted bitmap artwork produced by the distortion render. To accomplish this, the bitmap rendered distortion is used as a guide to match the vector shapes to by way of manipulating the vector shapes in Illustrator or similar graphical vector edit program or software. Vector shapes contained in an envelope can be manipulated by adjusting the envelope shape. The manipulation of the shape of vector objects or envelope shapes in Illustrator to result in the desired vector shapes involves using tools and techniques familiar to those of skill in the art who can appreciate the varying of accuracy with inherent dependency on operator interpretation, technique and ability.

Figure 9:
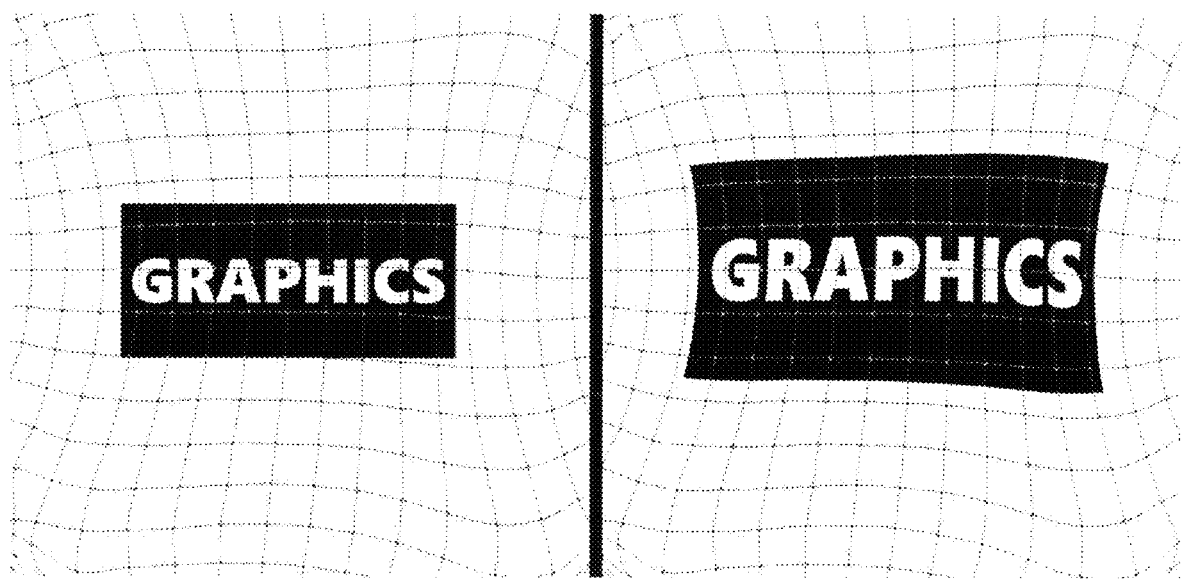
FIG. 9 is a photographic visualization of artwork before and after application of an envelop distortion.

While this manual approach is often useful when working with vector artwork, it is possible to use tools in Blender to directly output an envelope mesh for use in Adobe Illustrator. In this approach, a bitmap image is generated from the vector artwork which is then used to create the transformed image using the rendering step discussed above. Tools in Blender are then used to directly output the envelope mesh for the distorted image. The outputted envelope mesh can then be used directly in Adobe Illustrator to transform the original vector image such that it matches the distortion render without the need for manual adjustment and working. FIG. 9 illustrates how an undistorted image (on the left) can be distorted (on the right) when the envelope is applied.

The present method has several advantages over previous methods of creating transformed images. Firstly, the method produces transformed images which yield final 3D images which are highly accurate and distortion free. These transformed images can be generated quickly from images supplied as either bitmap images, vector images or combined vector/bitmap images. The method provides a great deal of control over placement of the image on the substrate to take full advantage of where the substrate will be distorted. The method also allows for quick turnaround times for producing transformed images. The method also allows users to pre-determine how images will look when displayed on three-dimensional parts.

A specific embodiment of the present invention has been disclosed; however, several variations of the disclosed embodiment could be envisioned as within the scope of this invention. It is to be understood that the present invention is not limited to the embodiments described above, but encompasses any and all embodiments within the scope of the following claims.

Therefore, what is claimed is:

1. A method for transforming a two-dimensional graphic image into a two-dimensional distorted image which is to be applied onto a three-dimensional surface of a part, the method comprising the steps of:
   providing a plurality of flat polymer webs each having a grid pattern printed thereon, the grid pattern comprising a uniform array of grid markers (grid dots) separated from each other by a space, the polymer webs each being formed of a thermally transformable polymer;
   thermally transforming each of the polymer webs into the three-dimension surface;
   selecting a suitably, representative sample of the grid markers common to each polymer web for comparison;
   measuring and recording a position for each grid marker in the representative sample of grid markers for each thermally transformed polymer web;
   comparing the representative sample of grid markers from each of the polymer webs and selecting a single target grid from the plurality of transformed polymer webs, the target grid being identified as the transformed polymer web whose grid markers in the representative sample reside closest to a center of variance of the positions of the grid markers in the representative sample of all of the transformed polymer webs;
   digitizing the three-dimensional shape of the target grid to form a geometric model of the target grid as a series of data points;
   creating a uniform smooth 3D model from the series of data points by smoothing the series of data points;
   texture mapping the two-dimensional graphic image onto the uniform smooth 3D model to create a mapped texture graphic, and creating the two-dimensional distorted image by rendering the mapped texture graphic.

2. The method of claim 1 wherein the two dimensional graphic image comprises a vector image, whereas a distorted version of the vector image is achieved in a vector image editing program by means of applying an envelope to the vector image wherein a mesh shape of the envelope is achieved by processing and converting distortion data that comes from the digitized part's collected forming data to build the envelope's shape which is then used to distort the image.

3. A method for transforming a two-dimensional graphic image into a two-dimensional distorted graphical image which is to be pre-applied onto a three-dimensional surface of a formed part, the method comprising the steps of:
   providing a plurality of flat webs each having a grid pattern printed thereon, the grid pattern comprising a uniform array of grid markers (grid dots) separated from each other by a space, the webs each being formed of a thermally transformable material;
   thermally transforming each of the polymer webs into the three-dimension surface;
   selecting a representative sample of the grid markers common to each polymer web;
   measuring and recording positions for each grid marker in the representative sample of grid markers for each thermally transformed web;
   selecting a single target grid from the plurality of transformed polymer webs, the target grid being selected by choosing the transformed polymer web whose grid markers in the representative sample reside closest to a center of variance of the positions of the grid markers in the representative sample of all of the transformed webs;
   digitizing the three-dimensional shape of the target grid to form a digital representation of the target grid as a series of data points;
   creating a smooth, distinct 3D model containing a precise delineation of the series of data points, with the ability to have texture data attached to it, and able to manipulate its data to output new texture graphics and data;
   texture mapping the two-dimensional graphic bitmap image onto the distinct 3D model to create a texture map, and
   creating a two-dimensional distorted image by rendering the processed (distorted) texture map.

4. The method of claim 2 wherein the two dimensional graphic image comprises a vector image, whereas a distorted version of the vector image is achieved in a vector image editing program by means of applying an envelope to the vector image wherein the mesh shape of the envelope is achieved by processing and converting distortion data that comes from the digitized part's collected forming data to build the envelope mesh's shape which is then used to distort the image.

5. The method of claim 3 wherein the grid pattern further comprises a uniform array of unique identifiers overlapping the uniform array of grid markers, each unique identifier separated by four to five grid markers.

6. The method of claim 3 wherein each of the webs has a plurality of index placeholders for precisely positioning in a transforming machine having corresponding index placeholders such that the webs are positioned identically in the transforming machine.

7. The method of claim 3 wherein the step of creating a distinct 3D model containing a precise delineation of the series of data points is done by the use of a polygonal object in a 3D graphical imaging application.

8. The method of claim 7 wherein smoothing is applied by using the 3D graphical application's subdivision tools and wherein a control object in the 3D application is utilized to fix the position of the digitized data points when the object is smoothed.

9. The method of claim 3 wherein the two-dimensional graphic bitmap image is generated from a vector image, a second two-dimensional distorted image being created directly from the vector image by applying an envelope distortion to the vector image, the envelope distortion distorting the vector image to match the two-dimensional distorted image.

10. A method of creating a 3D target grid to be used as a physical 3D model for transforming a two-dimensional graphic image into a two-dimensional distorted graphical image which is to be pre-applied onto a three-dimensional surface of a formed part, the method comprising the steps of:
   providing a plurality of flat webs each having a grid pattern printed thereon, the grid pattern comprising a uniform array of grid markers (grid dots) separated from each other by a space, the webs each being formed of a thermally transformable material;
   forming each of the webs into the three-dimension surface;
   selecting a representative sample of the grid markers common to each flat web;
   measuring and recording positions for each grid marker in the representative sample of grid markers for each formed web, and
   selecting a target grid from the plurality of formed webs, the target grid being selected by choosing the formed web whose grid markers in the representative sample reside closest to a center of variance of the positions of the grid markers in the representative sample of all of the formed webs.

11. The method of claim 10 further comprising the step of identifying in the target grid areas of greater and lesser variance corresponding to areas of lesser and greater variance in the positions of the grid markers.

* * * * *